May 14, 1940.　　　　H. C. BOWEN　　　　2,200,910
AUTOMATIC ADJUSTER
Filed Dec. 23, 1938
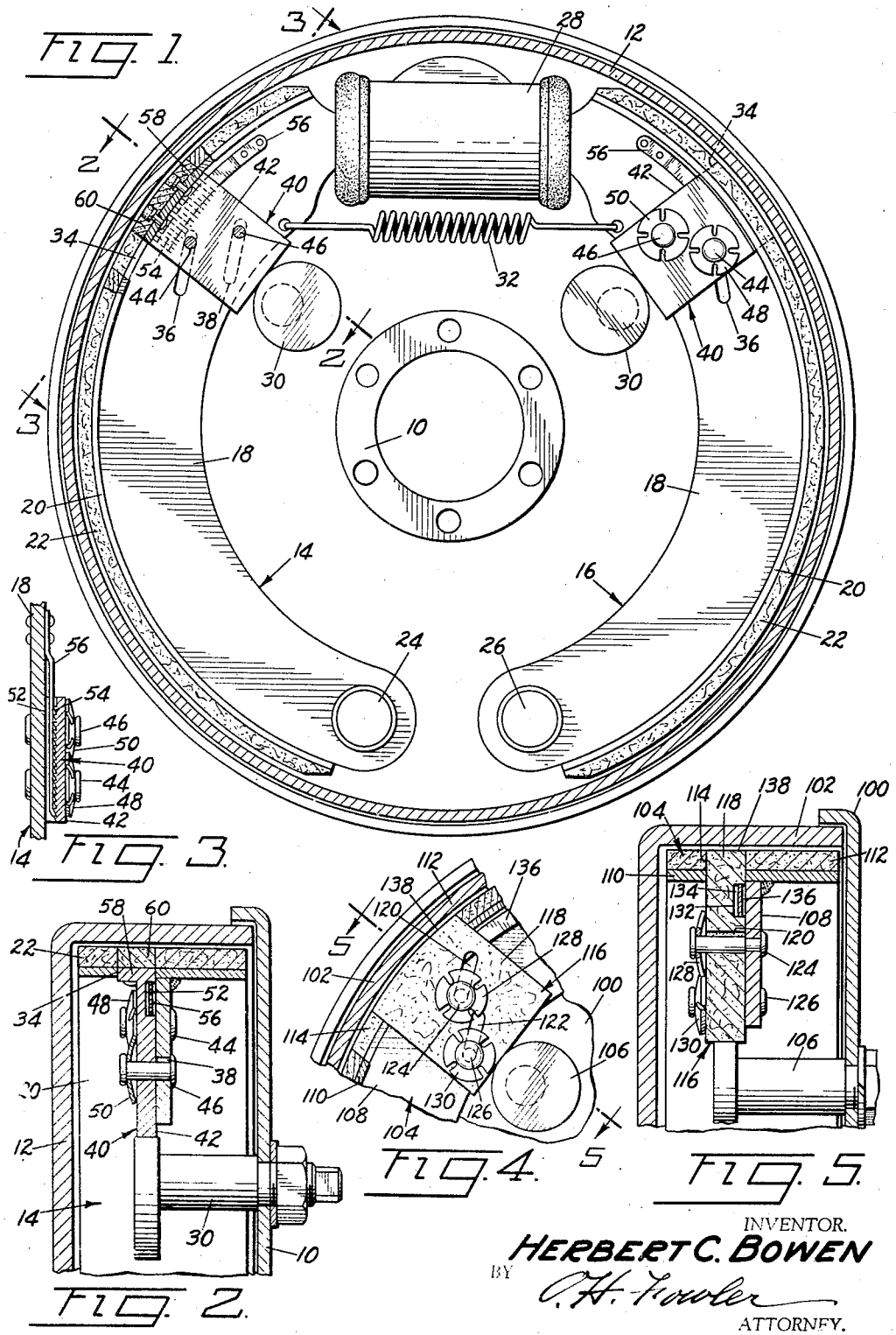
INVENTOR.
HERBERT C. BOWEN
BY
ATTORNEY.

Patented May 14, 1940

2,200,910

UNITED STATES PATENT OFFICE 2,200,910

AUTOMATIC ADJUSTER

Herbert C. Bowen, Detroit, Mich., assignor to Hydraulic Brake Company, Detroit, Mich., a corporation of California Application December 23, 1938, Serial No. 247,516

7 Claims. (Cl. 188—79.5)

This invention relates to brakes, and more particularly to automatic adjusters for brakes.

In brake structures including the conventional rotatable drum and a braking element having thereon a friction lining for cooperation with the drum, the braking element is generally supported, when at rest, on an adjustable stop in proper spaced relation to the drum. In normal use of the brake, due to repeated braking operations, the lining on the braking element is subjected to grilling wear. This results in materially decreasing the thickness of the lining and the consequent introduction of excessive play between the drum and the braking element. The present invention aims to avoid this excessive play by maintaining constant the relation of the braking element to the drum.

An object of the invention is to provide an automatic adjuster for a braking element controlled by wear of the friction lining on the braking element.

Another object of the invention is to provide an automatic adjuster for a braking element operative to maintain constant the relation between the braking element and a surface with which the braking element cooperates.

Another object of the invention is to provide an automatic adjuster for a brake operative to effect a positive adjustment of the braking element proportionate to wear on the friction lining of the braking element.

Yet another object of the invention is to provide an automatic adjuster for a brake wherein mal-adjustment of the braking element, due to the snapping action of the conventional retractile spring for the braking element, may be avoided.

Other objects and advantages of the invention will appear from the following description taken in connection with the accompanying drawing, and in which—

Fig. 1 is a vertical sectional view of a brake taken just back of the head of the drum illustrating the invention as applied;

Fig. 2 is a sectional view substantially on line 2—2, Fig. 1;

Fig. 3 is a sectional view substantially on line 3—3, Fig. 1;

Fig. 4 is a fragmentary view illustrating a modification of the automatic adjuster; and Fig. 5 is a sectional view substantially on line 5—5, Fig. 4.

Referring to the drawing for more specific details of the invention, 10 represents a fixed support or backing plate, and 12 a rotatable drum associated with the backing plate. A pair of corresponding interchangeable braking elements or shoes 14 and 16 are arranged on the backing plate. Each of the braking elements includes a web 18 supporting a rim 20 having suitably secured thereto a lining 22 for cooperation with the drum 12.

The articulate ends of the shoes are pivotally mounted on anchors 24 and 26 arranged in spaced relation to one another on the backing plate 10, and a fluid pressure actuated motor 28 of conventional type is secured to the backing plate between the braking elements, and connected to the force applying ends thereof.

Corresponding adjustable stops 30 suitably arranged on the backing plate serve, in conjunction with an automatic adjuster hereinafter described, to support the braking elements 14 and 16 in proper spaced relation to the drum 12, and a retractile spring 32 connects the braking elements. The motor 28 is operative to move the braking elements into engagement with the drum against the resistance of the retractile spring 32, and the spring serves to return the braking elements upon conclusion of a braking operation to the stops and to yieldingly retain them on the stops.

Brake structures of the type hereinabove described are well known in the art. In this type of brake and similar types, the inherent difficulty is found to be in effecting proper adjustment of the braking elements and in maintaining constant the relation of these elements to the drum when they are at rest or in retracted position, so as to avoid excessive play. The present invention aims to provide an automatic adjuster for the braking elements so constructed and operative as to overcome this difficulty.

As shown, each of the braking elements has stamped or cut therefrom a portion of its rim 20 and a corresponding portion of the lining supported on the rim, so as to provide a longitudinal slot 34, preferably arranged adjacent the force-applying end of the braking element with one of the side walls defining the slot contiguous with one side of the web 18, and portions are also stamped or cut from the web to provide two parallel slots 36 and 38 arranged bias or diagonally of the web.

An adjuster 40 includes a plate 42 bearing flat against the web 18 of the braking element and frictionally clamped thereto. As shown, rivets 44 and 46 slidable in the slots 36 and 38 in the web of the braking element pass through spaced openings in the plate 2, and the rivets have sleeved thereon, between their heads and the plate, spring washers 48 and 50.

The face of the plate 42 adjacent the web 18 of the braking element has a transverse slot 52, and at the bottom of this slot the plate has serrations 54 for cooperation with a flat spring 56 mounted on the web 18. One end of the plate cooperates with the adjustable stop 30, and the other end supports a rim segment 58 fitted for movement in the slot 34. The arc of the rim segment corresponds to the arc of the braking element, and suitably secured to the rim segment is a friction lining 60 for cooperation with the drum. This lining 60 has a lower frictional coefficient than the lining 22 on the braking element. The face of the lining 60 is contiguous with the face of the lining 22, and wear on the lining 60, because of its low frictional coefficient, is negligible.

A modification of the adjuster is illustrated in Figs. 4 and 5. In this modification a fixed support or backing plate 100 has associated therewith a rotatable drum 102. A braking element 104 is suitably mounted on the backing plate for cooperation with the drum, and a retractile stop 106, preferably adjustable, is associated with the braking element. As shown, the braking element is of a conventional type including a web 108 supporting a rim 110 having suitably secured thereto a friction lining 112. The rim and lining are longitudinally slotted as indicated at 114.

An adjuster 116 includes a non-metallic block or plate 118 bearing flatly against the web 108 of the braking element and frictionally clamped thereto. As shown, the non-metallic plate 118 has arranged therein, bias with respect to the plate, two parallel slots 120 and 122 for the reception of pins or studs 124 and 126 mounted in the web of the braking element, and interposed between the heads of the studs and the plate are spring washers 128 and 130. The plate has in its face adjacent the web 108 a transverse slot 132, and at the bottom of this slot the plate has serrations 134 for cooperation with a flat spring 136 mounted on the web of the braking element.

One end of the plate 118 cooperates with the adjustable stop 106, and the other end of the plate extends through the slot 114 and has an arcuate face 138 for cooperation with the drum. Preferably the arc of the face 138 corresponds to the arc of the braking element.

In a normal operation of the brakes, upon energization of the motor 28, the braking elements 14 and 16 are moved from their retracted position on the stops 30 to engage the friction linings 22 on the elements with the drum 12 so as to effectively retard rotation of the drum. During this operation, the friction linings 60 on the rims of the automatic adjusters 40, frictionally clamped to the braking elements, also engage the drum.

The friction linings on the braking elements are subjected to the usual wear incidental to this operation, and the wear on the linings 60 due to their low coefficient of friction is negligible. Due to this differential in the frictional coefficient of the linings 22 on the braking elements and the linings 60 on the adjusters, relative movement between the braking elements and the adjusters is effected proportionately to the wear on the linings 22. Accordingly, when the braking elements return to their retracted position upon the conclusion of a braking operation, the automatic adjusters engage the stops 30 and support the braking elements in proper spaced relation to the drum.

The relative movement between the braking elements and the automatic adjusters is due to pressure introduced between the linings 60 on the adjusters and the drum 12 during a normal braking operation, augmented by the wiping action of the drum. The movement of the automatic adjusters is bias of the braking elements against frictional resistance induced by the spring washers 48 and 50 serving to frictionally clamp the adjusters to the webs 18 of the braking elements.

Because of controlled direction of movement of the adjusters with respect to the braking elements, mal-adjustment is avoided when the braking elements are moved to their retracted position under the influence of the retractile spring 32, wherein the adjusters engage the stops 30 so as to support the braking elements. The load is supported longitudinally of the adjusters, and the direction of movement is bias of the adjusters, hence the tendency to retrograde movement of the adjusters is slight; and to entirely eliminate this tendency, ratchets 54 on the adjusters cooperate with flat springs 56 mounted on the braking elements.

A modification of the invention is illustrated in Figs. 4 and 5. In this modification the automatic adjuster 116 includes a non-metallic plate 118 having parallel slots 120 and 122 arranged therein bias of the plate for the reception of pins 124 and 126 mounted on the web of the braking element, and sleeved on the pins are spring washers 128 and 130 serving to frictionally clamp the adjuster to the web. This structure merely simplifies the adjuster. The mode of operation is identical to that of the preferred form, and therefore needs no explanation.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a rotatable drum, a braking element for cooperation therewith, a retractile stop associated with the element, and a member frictionally clamped to the element and movable thereof for cooperation with the drum and stop.

2. A brake comprising a rotatable drum, a braking element for cooperation therewith, a retractile stop associated with the element, a member movable diagonally on the element adapted to alternately engage the drum and the stop, and means for frictionally clamping the member to the element.

3. A brake comprising a rotatable drum, a braking element for cooperation therewith, a retractile stop associated with the element, a member frictionally clamped to the element and movable bias thereof for cooperation with the drum and stop, and means inhibiting retrograde movement of the member.

4. A brake comprising a rotatable drum, a braking element having a rim supporting a friction lining for cooperation with the drum and a slot through the rim and lining, a retractile stop associated with the braking element, a member slidable on the braking element bias with respect thereto having a part movable in and diagonally with relation to the slot for cooperation with the drum and a part for cooperation with the stop, and means for frictionally clamping the member to the braking element.

5. A brake comprising a rotatable drum, a braking element for cooperation with the drum having a slot therein, a retractile stop associated with the braking element, a member frictionally clamped to the element and slidable bias thereof having a part adapted to cooperate with the stop and another part movable in the slot diagonally with relation thereto and adapted to cooperate with the drum, and means for inhibiting retrograde movement of the member.

6. A brake comprising a rotatable drum, a braking element for cooperation therewith, a retractile stop associated with the element, spaced pins on the element, a non-metallic member for cooperation with the drum and stop having parallel slots arranged therein bias thereof receiving the pins, and spring washers on the pins for frictionally clamping the member to the element.

7. A brake comprising a rotatable drum, a braking element for cooperation therewith, a retractile stop associated with the element, pins mounted on the element, a non-metallic member for cooperation with the drum and stop having parallel slots arranged therein bias of the member for the reception of the pins, means on the pins for frictionally clamping the member to the braking element, and means inhibiting retrograde movement of the member.

HERBERT C. BOWEN.

CERTIFICATE OF CORRECTION.

Patent No. 2,200,910. May 14, 1940.

HERBERT C. BOWEN.

It is hereby certified that error appears in the printed specification of the above numbered patent requiring correction as follows: Page 2, second column, line 54, claim 1, after "movable" insert the word --bias--; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.